Patented June 23, 1953

2,643,194

UNITED STATES PATENT OFFICE 2,643,194

LIQUID GLUE

Louise K. Fencil, Brookfield, Ill., assignor to Armour and Company, Chicago, Ill., a corporation of Illinois No Drawing. Application November 18, 1946,
Serial No. 710,415

5 Claims. (Cl. 106—135)

This invention relates to a liquid glue mixture. More particularly the invention deals with animal protein adhesive compositions containing water-soluble chlorine substituted alcohols which serve as agents to dissolve and to retard or prevent the gelling of liquid adhesives.

At the present time, natural glue stocks having high test strength capacities are prepared in water solution which must be kept hot while in use. This is because the same glues in cold water solution possess a gelling tendency which causes them to set rapidly so that they soon become unworkable. The use of hot glue-water solutions, however, is undesirable because of the additional step which heating contributes to the gluing operation. Nevertheless, previous attempts at producing liquid glue of sufficiently high strength, which would not require heating, have been unsuccessful. The approaches to this attempt at prolonging "working life" have, in the main, followed two courses, that is, partial hydrolysis or the addition of various non-gelling agents.

The liquid glues on the market now are either of the dextrin type or of the partially hydrolyzed type. This latter type is produced by taking a glue stock such as bone glue and breaking it down with boiling water, enzymatic treatment or other suitable means to produce a liquid state. These treatments, however, considerably lower the test strength of the original glue and therefore make its use limited. Other glue stocks such as fish glue which do not show natural tendency toward gelling when in dilute solution are equally limited to uses where strength is not essential.

When the conventional non-gelling agents such as furfural, chloralhydrate, phenol, urea, calcium chloride, formamide, aniline and various other nitrogen compounds are added to hide or bone glue stocks a similar deterioration of the adhesive qualities of the glue is encountered. The method of adding these reagents has little effect upon their deteriorating qualities as far as the final glue strength is concerned.

I have now discovered that when halogen substituted alcohols are mixed with animal glue, the glue retains its original adhesiveness and remains in a workable liquid condition indefinitely. I can use any liquid, aliphatic, water-soluble halogen substituted alcohol. For example, I may use ethylene chlorohydrin, propylene chlorohydrin, or monochlorglycerol.

This class of chlorine substituted alcohols is unique in its application to glue proteins derived from animal sources. Organic solvents of a like nature have been used as solubilizing agents for vegetable proteins from maize, corn stalk, wheat, etc., but these proteins are characterized by being soluble in 70–80% alcohol. Their general classification is that of prolamins. On the other hand, I am using a protein of the albuminoid class. I may use any albuminoid protein, including for example those found in glue, gelatin, collagen, hair, hoofs, horns, etc.

The albuminoids are characterized by their absence of solubility in alcohols or neutral solvents.

I find that the halogenated alcohols alone have the ability to solubilize native animal glue proteins without impairing adhesiveness. The use of straight alcohol compounds has no effect upon improving the solubility or retarding gelation of these proteins. In fact, if one adds alcohol to a water solution of glue a heavy precipitate of protein occurs. Likewise, straight halogenated organic compounds such as ethylene dichloride, benzyl chloride and the chloroparaffins are not effective solvents for albuminoid proteins. I find that when a halogen and a hydroxyl group are attached to the same molecule in an organic compound this compound gains the peculiar ability of bringing certain proteins into solution. The fact that mere addition of a halogen to a liquid alcohol would change its capacity to act as a solvent for a specific class of proteins could not have been predicted.

Not only does this combination solubilize but, when applied to glue or gelatin, it also prevents the gelation of these products during subsequent aging. This retardation of the normal gelatin process is effective whether the glue and chlorohydrin are put into solution alone or whether the glue is first dissolved in water and then the halogen alcohol is added to the mixture.

By taking advantage of the liquid halogen substituted alcohols I am able to produce glue products which are ready for use and which will not gel before actual application. Other halogens may be substituted for the chlorine so long as the resulting halogenated product is liquid. Also liquid polyhalogen alcohols and polyhydroxy organic halogen compounds may be successfully used. Examples of these are ethylene bromohydrin, dibromohydrin, ethylene flurohydrin, dichlorohydrin, monochlorglycerol, etc. I prefer, however, to use ethylene chlorohydrin because of its ready commercial availability.

In my process the glue can be mixed first with water and then with the chosen halogen substituted alcohol or with the organic solvent alone to give an anhydrous mixture. The amounts of ethylene chlorohydrin and water may be altered to give a solution of the desired viscosity. Different types of glue stock will give different viscosities in solution depending upon the source of the glue.

*Example I*

100 gms. high test hide glue
100 gms. water
100 gms. ethylene chlorohydrin

The glue is first dissolved in water, then the ethylene chlorohydrin is mixed in.

*Example II*

100 gms. high test hide glue
500 gms. ethylene chlorohydrin

The mixture is kept at a temperature of about 60 to 80° C. for approximately 24 hours with occasional stirring.

*Example III*

100 gms. low test bone glue
100 gms. water
75 gms. ethylene chlorohydrin

Here again the glue is first dissolved in water and the ethylene chlorohydrin stirred in last.

*Example IV*

100 gms. low test bone glue
300 gms. ethylene chlorohydrin

The mixture is heated on the steam bath at a temperature of 60° for 24 hours until the glue is completely in solution.

*Example V*

100 gms. hide glue
700 gms. monochlorglycerol

Heated on steam bath for 24 hrs. at 70° C.

*Example VI*

100 gms. hide glue
400 gms. propylenechlorohydrin

Heated on steam bath for 24 hrs. at 70° C.

The temperature during the process of preparing my liquid glue mixture may be varied considerably. It is desirable, however, to avoid carrying the temperature above 80° C. since such temperatures will begin to break down the glue. Temperatures below 40° C. may be used but working at temperatures this low introduces serious practical considerations since longer times are required to solubilize the glue. The preferred range is between 40 and 80° C.

The foregoing specific examples have been given for purposes of explanation only and are not to be taken in a limiting sense. It is understood that my improvements may be practiced in widely differing ways, all within the spirit of the invention.

I claim:

1. A process for producing a liquid adhesive which comprises mixing animal glue with a liquid, aliphatic water-soluble halogen substituted alcohol at a temperature of 40° to 80° C. said alcohol being employed in a quantity sufficient to dissolve said animal glue.

2. A process for producing a liquid adhesive which comprises mixing animal glue with ethylene chlorohydrin at a temperature of 40° to 80° C., the amount of said ethylene chlorohydrin employed being at least 75% by weight of the said animal glue present.

3. A process for producing a liquid adhesive which comprises mixing animal glue with water and a liquid aliphatic, water-soluble, halogen substituted alcohol at a temperature of 40° to 80° C., said alcohol being employed in a quantity sufficient to dissolve said animal glue.

4. A liquid adhesive comprising animal glue and an aliphatic, liquid, water-soluble, halogen substituted alcohol, said adhesive having substantially the same adhesive strength as the said animal glue, the amount of said alcohol being sufficient to dissolve said animal glue.

5. A liquid adhesive comprising animal glue and ethylene chlorohydrin, said adhesive having substantially the same adhesive strength as said animal glue, the amount of said ethylene chlorohydrin employed being at least 75% by weight of the said animal glue present.

LOUISE K. FENCIL.

References Cited in the file of this patent

UNITED STATES PATENTS

| Number | Name | Date |
|---|---|---|
| 2,089,460 | Wilmanns et al. | Aug. 10, 1937 |

FOREIGN PATENTS

| Number | Country | Date |
|---|---|---|
| 240,174 | Great Britain | July 22, 1926 |
| 463,043 | Great Britain | Mar. 16, 1937 |